(12) United States Patent
DeGrazia, Jr. et al.

(10) Patent No.: US 6,314,949 B1
(45) Date of Patent: Nov. 13, 2001

(54) VEHICLE AIR INDUCTION SYSTEM

(75) Inventors: Torey W. DeGrazia, Jr., Park Ridge; Margaret Rajski, Ingleside, both of IL (US)

(73) Assignee: Fuel Management, Inc., Park Ridge, IL (US)

( * ) Notice: Subject to any disclaimer, the term of this patent is extended or adjusted under 35 U.S.C. 154(b) by 0 days.

(21) Appl. No.: 09/660,671

(22) Filed: Sep. 13, 2000

Related U.S. Application Data

(60) Provisional application No. 60/157,090, filed on Oct. 1, 1999, and provisional application No. 60/153,733, filed on Sep. 13, 1999.

(51) Int. Cl.[7] .............................. G05D 23/00; F02G 5/00
(52) U.S. Cl. ........................................... 123/542; 123/556
(58) Field of Search ..................................... 123/542, 556

(56) References Cited

U.S. PATENT DOCUMENTS

| | | |
|---|---|---|
| 1,581,365 | 4/1926 | Thavenet . |
| 1,774,352 | 8/1930 | Bull . |
| 1,863,015 | 6/1932 | Kamrath . |
| 2,286,803 | 6/1942 | Holthouse . |
| 2,853,153 | 9/1958 | Sexton . |
| 3,977,195 | 8/1976 | Treuil . |
| 4,501,270 | 2/1985 | Ulinskas . |
| 4,625,910 | * 12/1986 | Kawamura ........................... 123/556 |
| 4,778,029 | 10/1988 | Thornburgh . |
| 5,172,753 | 12/1992 | Kadle et al. . |
| 5,331,807 | 7/1994 | Hricak . |
| 5,618,323 | 4/1997 | Shearn et al. . |

* cited by examiner

*Primary Examiner*—Marguerite McMahon
(74) *Attorney, Agent, or Firm*—Pauley Petersen Kinne & Fejer

(57) ABSTRACT

This invention is an air induction system that enables an enhanced flow of temperature-controlled, magnetically influenced forced air to the air intake of internal combustion, turbine-type, and other engines having an air intake manifold. An interior air inlet is positioned in communication with a passenger compartment of the vehicle. Additionally, or alternatively, a plenum outlet is positioned in an HVAC plenum of the vehicle. An air supply duct extends between the interior air inlet and/or the plenum outlet and the air intake manifold supplies conditioned air to the air intake manifold. Performance may be enhanced with the positioning of magnets and/or an air diverter valve into the system. As a result of the enhanced flow of magnetically influenced air and the more steady state of the temperature of the inducted air, fuel consumption and air emissions levels are reduced.

20 Claims, 5 Drawing Sheets

VEHICLE AIR INDUCTION SYSTEM

This application claim benefit of provisional application No. 60/153,733 filed Sep. 13, 1999 and claim benefit of Ser. No. 60/157,090 filed Oct. 4, 1999.

BACKGROUND OF THE INVENTION

1. Field of the Invention

This invention relates to an air induction system that enables an enhanced flow of temperature-controlled, magnetically influenced forced air to the air intake of internal combustion, turbine-type, and other engines.

2. Description of Related Art

Conventional air induction systems have an air filter assembly located in or outside of the engine compartment of the vehicle. An air filter is required at the air intake manifold to filter air as it enters the engine. Unfiltered inducted air generally contains dirt particles and other contaminants and has a temperature equal to or greater than the ambient temperature outside the vehicle. During periods of extremely hot or cold weather conditions, fuel consumption increases. Air filters that are currently being used today are made of rigid tubing, have a paper air filter element, and are enclosed in a restrictive housing. These air filters, which are located either inside or outside the engine compartment, place obstructions in the path of the incoming air and thereby restrict its movement.

More and more manufacturers are providing heating, ventilating, and air conditioning (HVAC) systems that use filtered air. The air induction system according to one preferred embodiment of this invention will use filtered, temperature-stabilized air as a supply of combustion air for the engine thereby eliminating the need for a separate air filter and the restriction in airflow associated with the filter.

In addition, the air induction system will maintain the temperature of the inducted air at a more steady state by using the HVAC system and insulated ductwork to eliminate temperature extremes. Maintaining the inducted air at a more stable and even air temperature is extremely important for fuel economy and emissions control, especially under cold and extremely hot weather conditions. According to the U.S. Environmental Protection Agency's (USEPA's) "Fuel Economy Impact Analysis of RFG" (EPA 420-F95-003, August 1995), lower winter temperature (20° F. versus 77° F.) can decrease fuel economy by 13 percent, notwithstanding the use of reformulated fuel.

SUMMARY OF THE INVENTION

It is one object of this invention to provide an air induction system that reduces fuel consumption.

It is another object of this invention to provide an air induction system that reduces air emission levels.

It is another object of this invention to provide an air induction system that draws filtered, temperature-controlled air from the passenger compartment and/or the HVAC plenum into the air intake manifold.

It is yet another object of this invention to provide an air induction system that permits control of the distribution of air between the air intake manifold and the passenger compartment.

This air induction system according to the preferred embodiments of this invention can be installed into a vehicle during or after the manufacturing process. Preferably, the air induction system is connected to a filtered HVAC system of the vehicle. However, the air induction system is compatible with any ventilation system. If necessary, an air filter suitable for the HVAC system can be installed.

The air induction system according to a preferred embodiment of this invention is used in connection with vehicles having an engine with an air intake manifold. Preferably, an interior air inlet is positioned in communication with a passenger compartment of the vehicle. Alternatively, or additionally, a plenum outlet is positioned in an HVAC plenum of the vehicle to provide conditioned air from the HVAC plenum to the air intake manifold.

Alternatively, or additionally, magnets are positioned inside the air intake manifold of the engine.

An air supply duct is provided to extend between the interior air inlet and/or the plenum outlet and the air intake manifold. The air supply duct resultingly supplies conditioned air from the passenger compartment and/or the HVAC plenum to the air intake manifold. In addition, a plurality of magnets are preferably positioned in or around the air supply duct to improve fuel efficiency and/or emissions.

According to one preferred embodiment of the invention, an air diverter valve is connected within the air supply duct and between the plenum outlet and the interior air inlet. The air diverter valve preferably controls air flow into and out of the passenger compartment and/or the HVAC plenum and into the air intake manifold.

During cold weather conditions, hot air from the HVAC system is directed/drawn into the air supply duct. During hot weather conditions, cool air from the HVAC system is directed/drawn into the air supply duct. During weather conditions that do not require the use of HVAC-temperature-controlled air, air will be directed/drawn into the air supply duct from the passenger compartment. By responding to the ambient air temperature, the air diverter valve will enable the intake of air from the HVAC plenum and the passenger compartment or from the passenger compartment of the vehicle.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
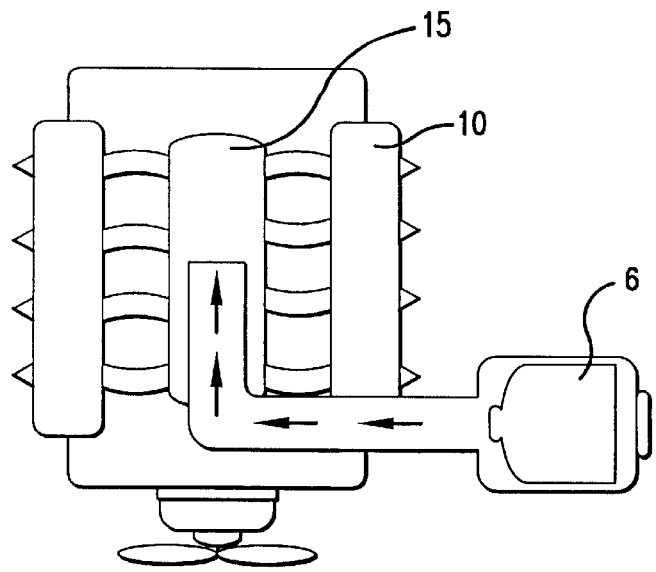
FIG. 1 is a schematic view of an air induction system according to the prior art.

FIG. 1 shows a prior art air induction system wherein air flows from ambient and travels through an air filter 6 and into an air induction manifold 15 before entering engine 10.

Figure 2:
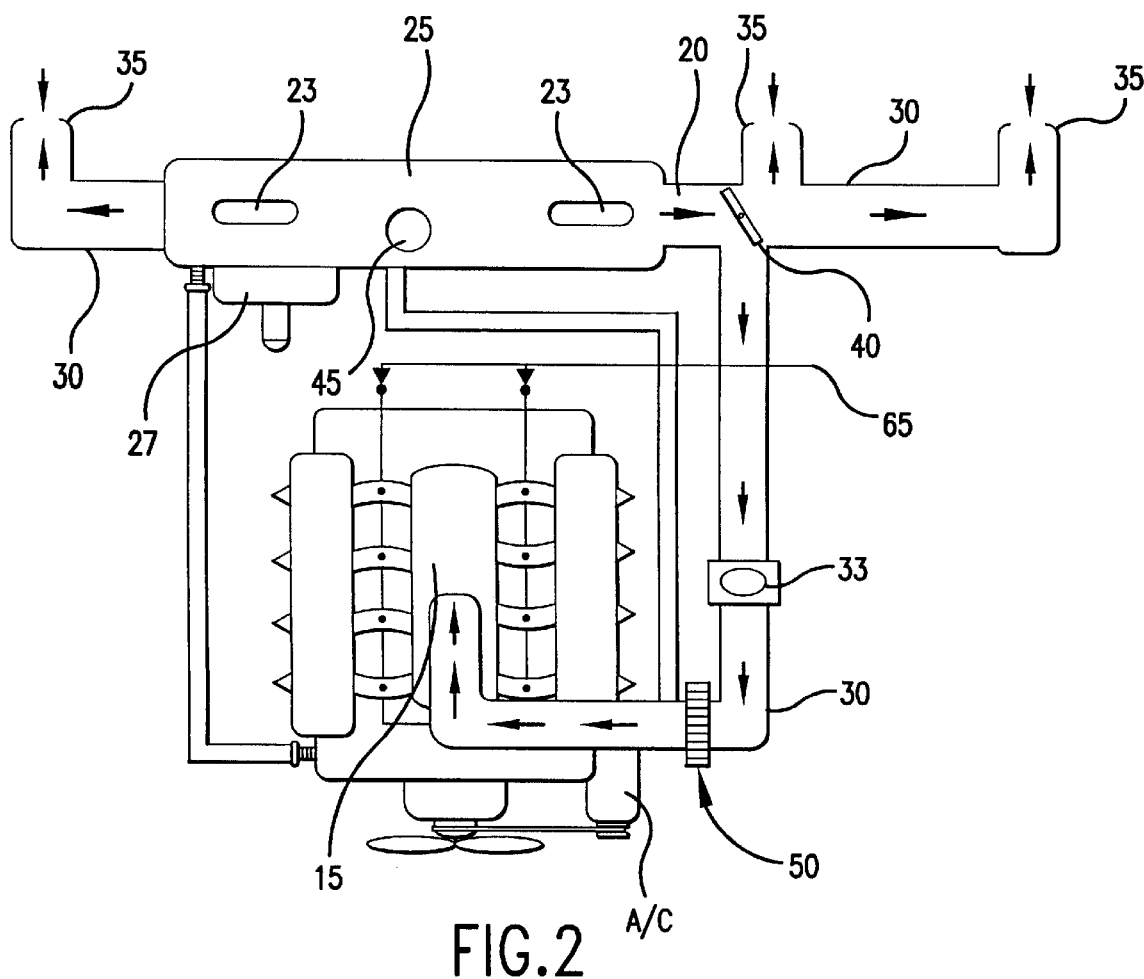
FIG. 2 is a schematic view of the air induction system according to one preferred embodiment of this invention.

As shown in FIG. 2, the air induction system according to one preferred embodiment of this invention comprises an alternative system for providing air to air intake manifold 15 of engine 10.

Figure 3:
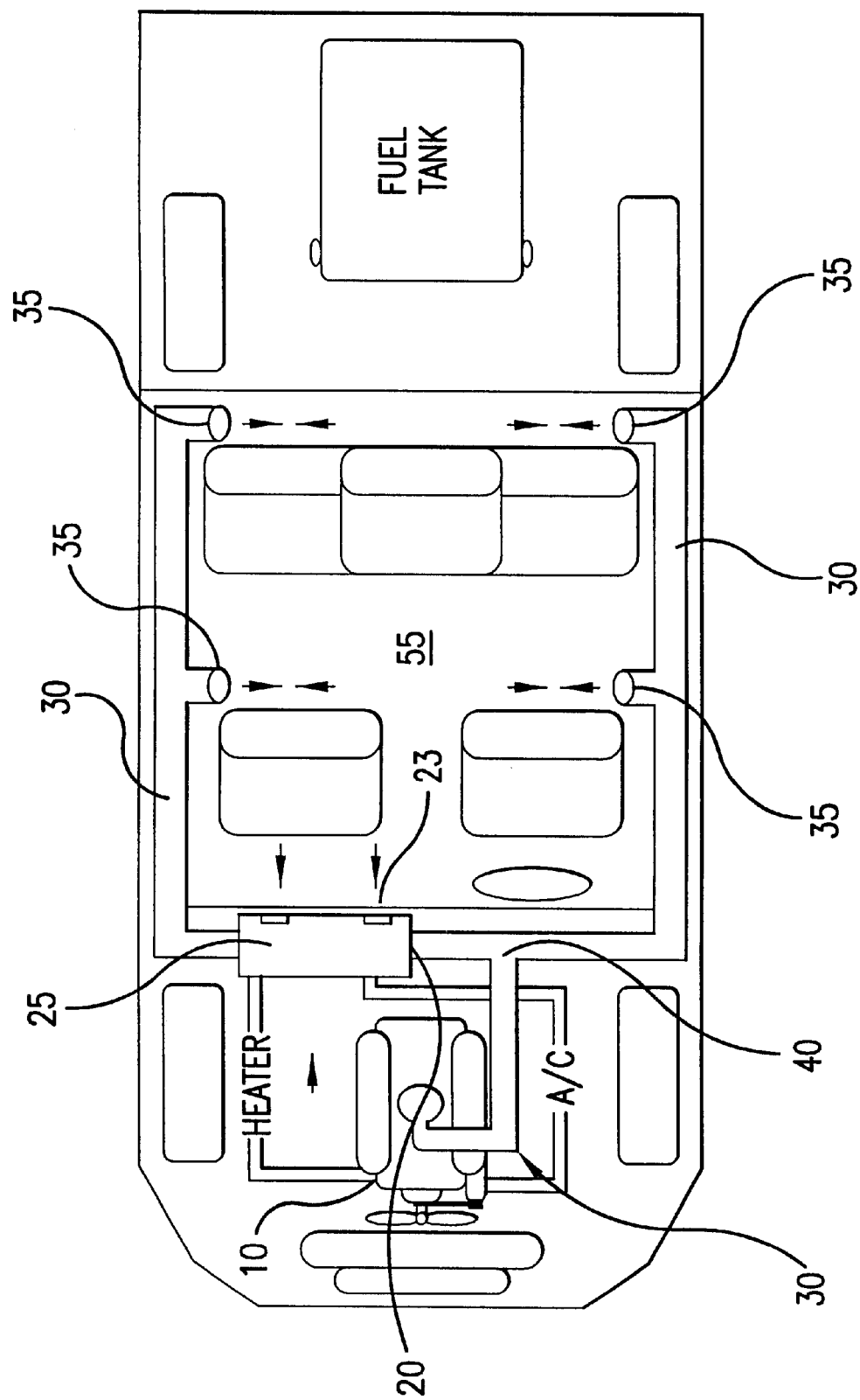
FIG. 3 is a schematic view of the air induction system according to one preferred embodiment of this invention.

According to one preferred embodiment of this invention, as shown in FIGS. 2 and 3, one or more plenum outlets 20 are positioned within HVAC plenum 25 within the vehicles HVAC system. Fresh and/or recirculated air inlets 23 are necessarily required in conventional HVAC plenums 25. Plenum outlets 20 are preferably located in HVAC plenum 25 upstream of HVAC fan 27, shown in FIG. 2, that forces air into passenger compartment 55.

One or more interior air inlets 35 are preferably positioned within passenger compartment 55. Interior air inlets 35 may be positioned in existing internal vent locations or positioned in new locations suitable for drawing air from passenger compartment 55. Interior air inlets 35 may also be used as air outlets as required for providing conditioned air from the HVAC system to passenger compartment 55. Interior air inlets 35 may be situated in passenger compartment 55 of the vehicle as indicated in FIG. 3. The locations of interior air inlets 35 shown on FIGS. 2 and 3 are: (1) provided only for illustrative purposes; (2) may vary depending on the vehicle, the HVAC system and the type of engine; and (3) are not limited to these locations.

According to a preferred embodiment of this invention, air supply duct 30 extends from the HVAC plenum 25 to air intake manifold 15 of engine 10. Air supply duct 30 is preferably insulated to maintain a constant temperature of the air within air supply duct 30 and to preserve such constant temperature at the time of delivery of the air to air intake manifold 15. Insulation may be positioned externally along an outside surface of air supply duct 30 or otherwise positioned so as to preserve the temperature of the air within air supply duct 30. The exact location, length and configuration of air supply duct 30 depends on the vehicle, however air supply duct 30 is preferably as short as practicable.

According to one preferred embodiment of this invention, air diverter valve 40 is positioned within HVAC plenum 25, within a portion of air supply duct 30, or within an air supply chamber between one or more plenum outlets 20 and one or more interior air inlets 35. According to one preferred embodiment of this invention, an automatically or manually controlled air diverter valve 40 is located downstream of HVAC plenum 25. Alternatively, air diverter valve 40 may be located within an air supply chamber or within HVAC plenum 25. The location of air diverter valve 40 shown in FIG. 1: (1) is provided only for illustrative purposes; (2) may vary depending on the vehicle, the HVAC system and the type of engine; and (3) is not limited to this location.

According to one preferred embodiment of this invention, one or more magnets 50, either permanent or electromagnets, are placed in and/or around air supply duct 30. The location of magnets 50 shown on FIG. 2: (1) is provided only for illustrative purposes; (2) may vary depending on the vehicle, the HVAC system and the type of engine; and (3) is not limited to this location. In addition or as an alternative, magnets 50 may be installed in or integrated with air intake manifold 15 at the time of manufacture. As a result of the positioning of such magnets 50 in and/or around air supply duct 30 and/or related components, a magnetic force field is created within and around the air supply duct 30 that results in a beneficial effect on fuel efficiency and emissions. Air supply duct 30 and the one or more magnets 50 around air supply duct 30 are preferably covered with insulation to maintain the steady temperature of the intake air.

If a filter is not included in the HVAC system or if a more thoroughly filtered airflow is required, filter 45 can be placed at air intake manifold 15 and/or air supply duct 30 of the HVAC system, as shown in FIG. 2. With filter 45 in place, the air induction system can be used in engines that do not have a filtered HVAC system air supply as part of the standard OEM. The location of filter 45 shown in FIG. 2: (1) is provided only for illustrative purposes; (2) may vary depending on the vehicle, the HVAC system, and the type of engine; and (3) is not limited to this location.

In one preferred embodiment of this invention, auxiliary fan 33 may be positioned within or in fluid communication with air supply duct 30 to enhance the flow of air moved by the HVAC system. Auxiliary fan 33 would also further enhance the flow of air to air intake manifold 15.

According to one preferred embodiment of this invention, one or more pressure-regulated airflow valves 65 are installed on or near air intake manifold 15. Airflow valves 65 as shown in FIG. 2 are preferably located on or near air intake manifold 15 to permit the circulation of air within air intake manifold 15; to maintain a constant pressure within air intake manifold 15, and to eliminate the damming of air within air supply duct 30.

The air induction system according to this invention preferably enables temperature-controlled air to be moved from passenger compartment 55 and/or the HVAC system to air intake manifold 15 of engine 10 through air supply duct 30. Air supply duct 30 is preferably sufficiently large to reduce the amount of resistance that occurs as the air moves from plenum outlets 20 and/or interior air inlets 35 to air intake manifold 15 of engine 10. The amount of the airflow may be enhanced by the use of auxiliary duct fan 33. Because the air that flows through air supply duct 30 is preferably filtered by the HVAC system and/or filter 45 on the plenum outlets 20, particulate matter and contaminants are removed from the system prior to the intake of air into air supply duct 30.

According to one preferred method of operation of this invention, air in air supply duct 30 within an optimal temperature range for combustion air will be drawn from HVAC plenum 25 and passenger compartment 55 or solely from HVAC plenum 25 or passenger compartment 55 of the vehicle.

HVAC plenum 25 is preferably connected to air supply duct 30 that is separated from HVAC plenum 25 by air diverter valve 40. Depending on the temperature of the ambient air, the automatically or manually thermally controlled air diverter valve 40 will direct air into air supply duct 30 of engine 10 from HVAC plenum 25 and passenger compartment 55 or solely from HVAC plenum 25 or passenger compartment 55 of the vehicle. Air diverter valve 40 will preferably respond to temperature changes and may be manually or computer controlled.

During cold weather conditions, hot air from the HVAC system is directed/drawn into air supply duct 30. During hot weather conditions, cool air from the HVAC system is directed/drawn into air supply duct 30. During weather conditions that do not require the use of HVAC-temperature-controlled air, air will be directed/drawn into air supply duct 30 from passenger compartment 55. By responding to the ambient air temperature, air diverter valve 40 will enable the intake of air from HVAC plenum 25 and/or passenger compartment 55 of the vehicle depending upon the sensed conditions.

Figure 4:
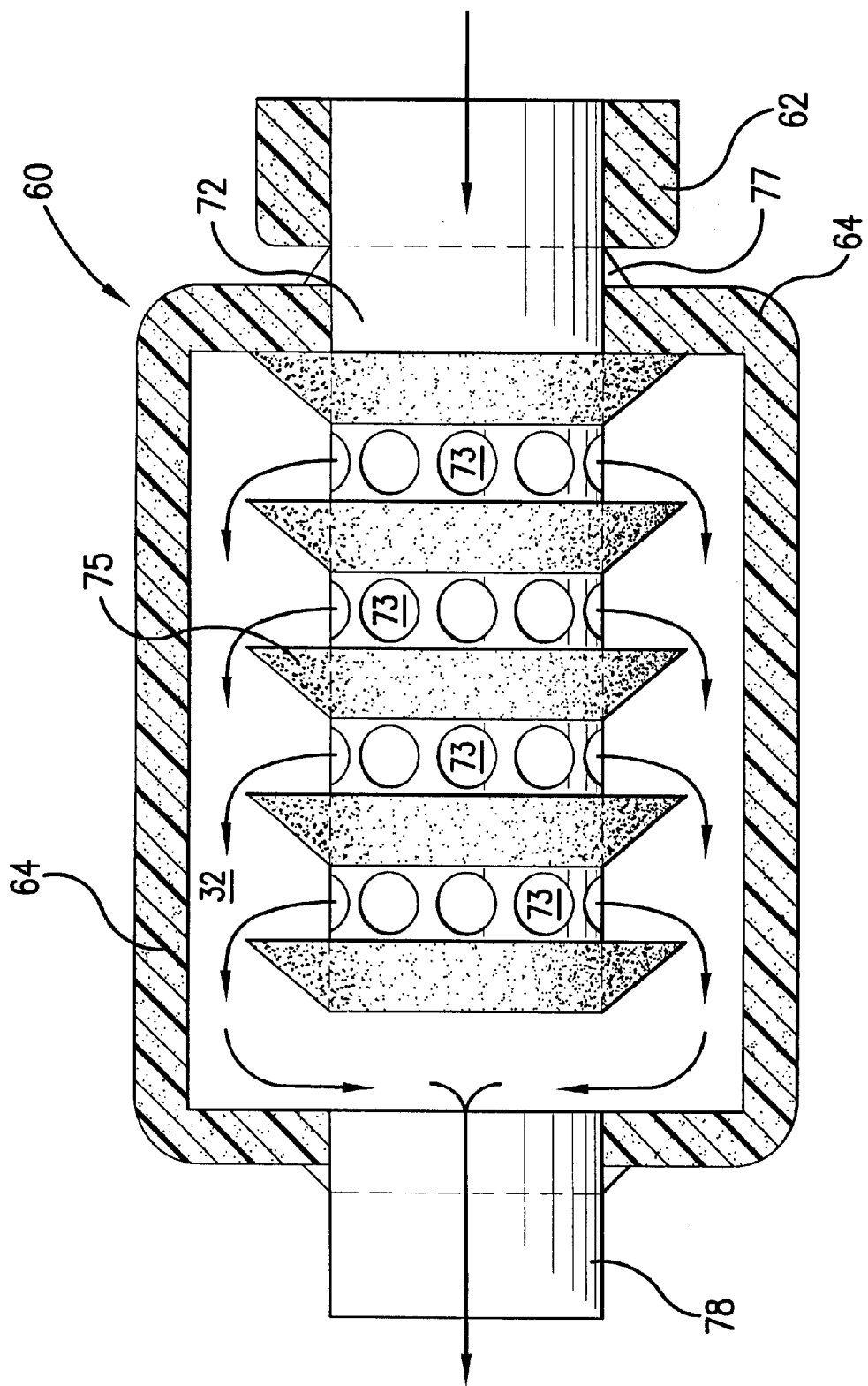
FIG. 4 is a cross-sectional side view of a silencer according to one preferred embodiment of this invention.
Figure 5:
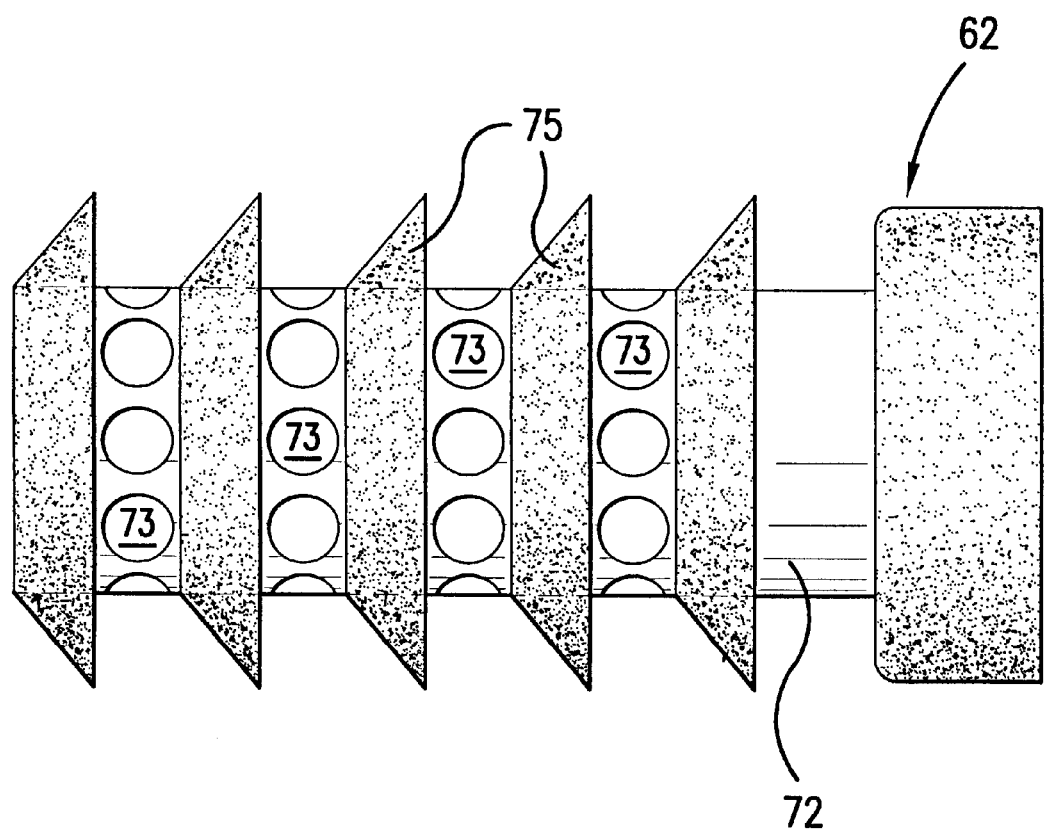
FIG. 5 is a diagrammatic side view of a portion of a silencer according to one preferred embodiment of this invention.

According to another preferred embodiment of this invention, as shown in FIGS. 4–7, air silencer 60 is used in connection with the air induction system to dampen noise both in passenger compartment 55 and externally of the vehicle. If necessary, air silencer 60 will be used to reduce the level of noise emanating from the air induction system. As shown in FIGS. 4–7, air silencer 60 includes inner air horn 62 and outer shell 64. Inner air horn 62 preferably includes a hollow, cylindrical body portion 72 having a plurality of apertures 73 and a forming bore 74. Preferably, but not necessarily, apertures 73 are arranged in bands around a circumference of body portion 72 as shown in FIGS. 4 and 5. A plurality of baffles 75 are positioned around the circumference of body portion 72. Preferably, but not necessarily, baffles 75 have a ring shape. It is apparent to one skilled in the art that baffles 75 may have any suitable shape. Baffles 75 are preferably made of a foam material. Other suitable materials for muffling sound known to those skilled in the art may be used to make baffles 75. Preferably, foam baffles 75 are positioned between adjacent bands of apertures 73 as shown in FIGS. 4 and 5.

Figure 6:
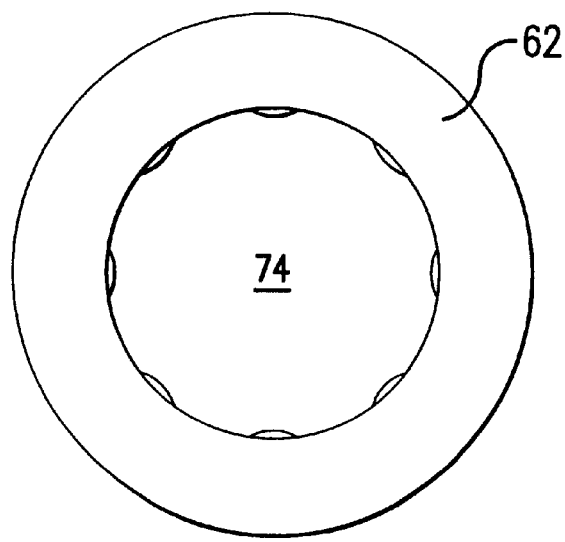
FIG. 6 is a front view of a portion of a silencer according to one preferred embodiment of this invention.
Figure 7:
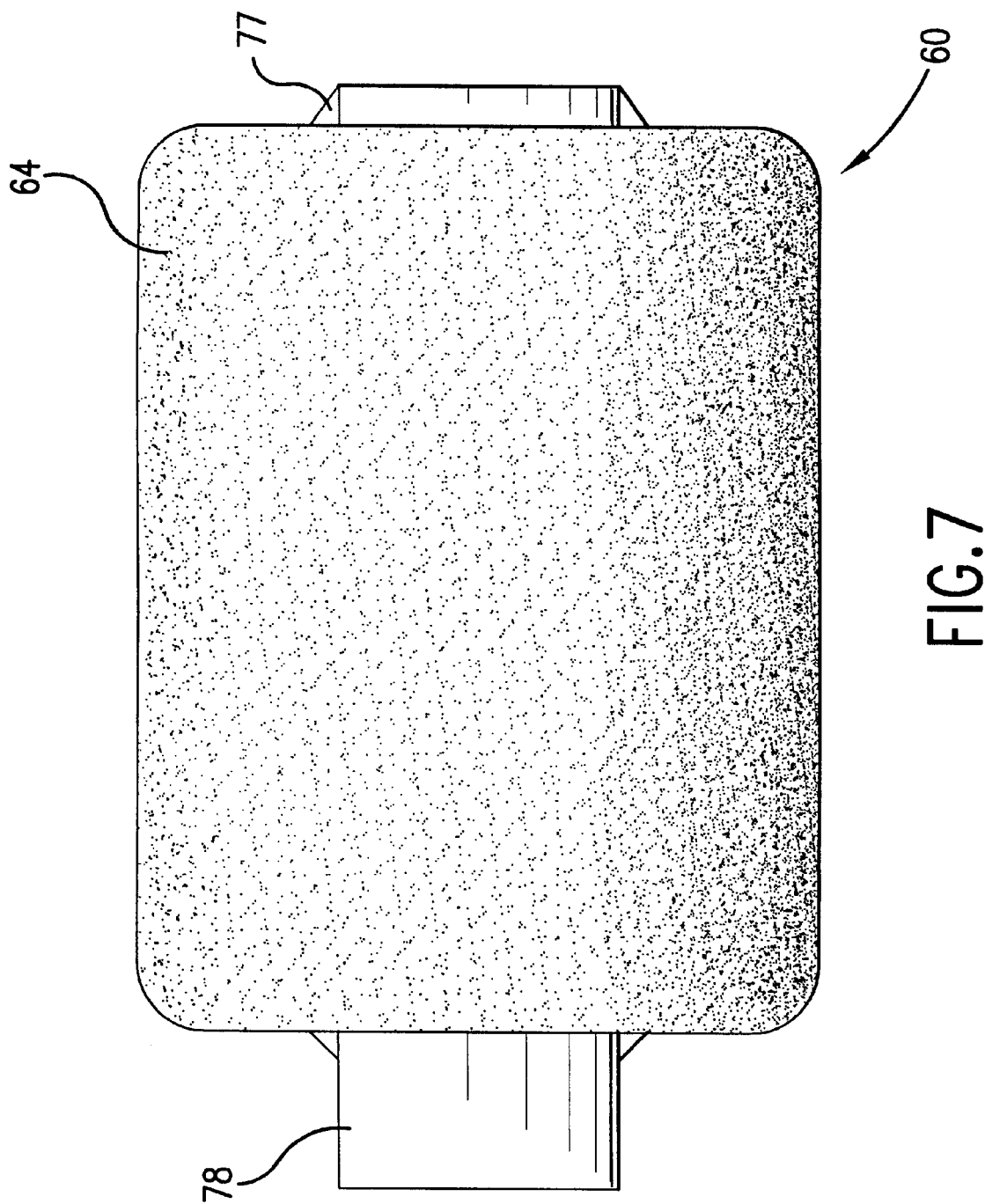
FIG. 7 is a side view of a silencer according to one preferred embodiment of this invention.

As shown in FIGS. 4 and 7, according to one preferred embodiment of this invention, outer shell 64 of air silencer 60 consists of two pieces. Preferably, the pieces of outer shell 64 generally have a semi-cylindrical shape. In one preferred embodiment of this invention, outer shell 64 is made of a liner, for example a plastic liner with foam insulation attached to an inner surface of the plastic liner. Each piece of outer shell 64 preferably includes lip portion 77 and outlet portion 78. Lip portion 77 and outlet portion 78 of each outer shell 64 have a generally semi-circular shape. When the pieces of outer shell 64 are connected, an inner cavity is formed as well as a lip portion 77 and an outlet portion 78. In the preferred embodiments according to this invention, inner air horn 62 is securely positioned within lip portion 77 of outer shell 64 to form air silencer 60 as shown in FIG. 4. FIG. 6 is a front view of air silencer 60 having inner air horn 62 securely positioned within outer shell 64. Air silencer 60 is attachable to each interior air inlet 35 to provide a free passage of air while reducing the noise level in interior air inlets 35.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the principles of the invention.

We claim:

1. An air induction system for a vehicle having an engine with an air intake manifold comprising:
   a plenum outlet positioned in an HVAC plenum of the vehicle; and
   an air supply duct extending between the plenum outlet and the air intake manifold for supplying conditioned air to the air intake manifold.

2. The air induction system of claim 1 wherein the plenum outlet is positioned downstream of an HVAC fan.

3. The air induction system of claim 1 further comprising a plurality of magnets positioned along the air supply duct.

4. The air induction system of claim 1 further comprising an air diverter valve positioned downstream of the HVAC plenum.

5. The air induction system of claim 1 further comprising a filter positioned upstream of the HVAC plenum.

6. The air induction system of claim 1 further comprising a plurality of magnets integrally formed within the air intake manifold.

7. The air induction system of claim 1 further comprising one or more interior air inlets positioned within a passenger compartment of the vehicle, each of the one or more interior air inlets connected with respect to the air supply duct.

8. The air induction system of claim 7 further comprising an air silencer positioned with respect to one or more of the interior air inlets.

9. The air induction system of claim 7 further comprising an air diverter valve connected between the plenum outlet and the interior air inlets.

10. An air induction system for a vehicle having an engine with an air intake manifold comprising:
    an interior air inlet positioned in communication with a passenger compartment of the vehicle; and
    an air supply duct extending between the interior air inlet and the air intake manifold for supplying conditioned air to the air intake manifold.

11. The air induction system of claim 10 further comprising a plenum outlet positioned in an HVAC plenum of the vehicle, the plenum outlet in communication with the air supply duct.

12. The air induction system of claim 11 further comprising an air diverter valve connected between the plenum outlet and the interior air inlet.

13. The air induction system of claim 10 further comprising a plurality of magnets positioned along the air supply duct.

14. The air induction system of claim 10 further comprising a plurality of magnets positioned with respect to the air intake manifold.

15. The air induction system of claim 10 further comprising an air silencer positioned with respect to the interior air inlets.

16. The air induction system of claim 10 further comprising one or more airflow valves positioned with respect to the air intake manifold.

17. An air induction system for a vehicle having an engine with an air intake manifold comprising:
    an interior air inlet positioned in communication with a passenger compartment of the vehicle;
    an air supply duct extending between the interior air inlet and the air intake manifold for supplying conditioned air to the air intake manifold;
    a plenum outlet positioned in an HVAC plenum of the vehicle, the plenum outlet in communication with the air supply duct and the interior air inlet.

18. The air induction system of claim 17 further comprising an air diverter valve connected between the plenum outlet and the interior air inlet.

19. The air induction system of claim 17 further comprising a plurality of magnets positioned with respect to the air intake manifold.

20. The air induction system of claim 17 further comprising one or more airflow valves positioned with respect to the air intake manifold, the one or more airflow valves relieving excessive pressure within the air intake manifold.

* * * * *